United States Patent
She et al.

(10) Patent No.: US 10,810,875 B2
(45) Date of Patent: Oct. 20, 2020

(54) NAVIGATION OF IMPAIRED VEHICLE

(71) Applicant: Ford Global Technologies, LLC, Dearborn, MI (US)

(72) Inventors: Eric She, Troy, MI (US); Ryan J. Skaff, Farmington Hills, MI (US); Cheri Lyn Hansen, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 15/642,511

(22) Filed: Jul. 6, 2017

(65) Prior Publication Data

US 2019/0012913 A1    Jan. 10, 2019

(51) Int. Cl.
   *G08G 1/09*        (2006.01)
   *G08G 1/0968*      (2006.01)
   (Continued)

(52) U.S. Cl.
   CPC ....... *G08G 1/096816* (2013.01); *B60W 10/04* (2013.01); *B60W 10/18* (2013.01);
   (Continued)

(58) Field of Classification Search
   CPC ............ G08G 1/096816; G07C 5/0808; G07C 5/008; G07C 5/0841; B60W 10/20; B60W 10/18; B60W 10/04; B60W 2750/40; B60W 2710/18; B60W 2710/20; B60W 2510/20; B60W 2510/18; B60W 2550/40; B60W 2550/10; B60W 30/00; B60W 2756/10; B60W 2556/45; B60W 2554/00; B60W 50/029; B60W 2030/082; B60W 2556/50;
   (Continued)

(56) References Cited

U.S. PATENT DOCUMENTS 6,108,031 A   8/2000  King et al.
8,874,301 B1  10/2014 Rao et al.
              (Continued)

FOREIGN PATENT DOCUMENTS

CA    2071831 A1    6/1991
CN    102346473 B   12/2012
              (Continued)

OTHER PUBLICATIONS

Langley, Hugh; "I used virtual reality to take control of someone else's car—while they were in I," Techradar India; Oct. 15, 2015; 7 pages.
(Continued)

*Primary Examiner* — Kimberly S Berona
*Assistant Examiner* — Michael V Kerrigan
(74) *Attorney, Agent, or Firm* — Frank A. MacKenzie; Bejin Bieneman PLC

(57) ABSTRACT

A system includes a computer programmed to receive first data from a first source that is a vehicle. The first data identifies a fault of the vehicle. The computer is programmed to receive second data from a second source outside the vehicle describing an area around the vehicle. The computer is programmed to determine, based on the first and second data, a navigational plan. The computer is programmed to transmit an instruction to the vehicle to actuate the vehicle according to the navigational plan.

10 Claims, 3 Drawing Sheets

(51) Int. Cl.
*B60W 10/04* (2006.01)
*B60W 10/18* (2012.01)
*B60W 10/20* (2006.01)
*G07C 5/08* (2006.01)
*G07C 5/00* (2006.01)
*B60W 30/00* (2006.01)

(52) U.S. Cl.
CPC ............ *B60W 10/20* (2013.01); *B60W 30/00* (2013.01); *G07C 5/008* (2013.01); *G07C 5/0808* (2013.01); *G07C 5/0841* (2013.01); *B60W 2510/18* (2013.01); *B60W 2510/20* (2013.01); *B60W 2554/00* (2020.02); *B60W 2556/45* (2020.02); *B60W 2710/18* (2013.01); *B60W 2710/20* (2013.01); *B60W 2756/10* (2020.02)

(58) Field of Classification Search
CPC .. G05D 2201/02; G05D 1/0285; G05D 1/028; G05D 1/0278; G05D 1/0259; G05D 1/0257; G05D 1/0253; G05D 1/024; G05D 1/0223; G05D 1/0214; G01C 21/343
See application file for complete search history.

(56) References Cited

U.S. PATENT DOCUMENTS

| | | | |
|---|---|---|---|
| 10,317,899 B2* | 6/2019 | Liu | ............ G07C 5/0816 |
| 2015/0178998 A1* | 6/2015 | Attard | ............ G07C 5/008 |
| | | | 701/23 |
| 2016/0021178 A1* | 1/2016 | Liu | ............ H04W 76/10 |
| | | | 370/216 |
| 2019/0072969 A1* | 3/2019 | Han | ............ G05D 1/0088 |

FOREIGN PATENT DOCUMENTS

| | | |
|---|---|---|
| CN | 102862568 B | 5/2015 |
| CN | 103473951 B | 9/2015 |
| DE | 102015217390 A1 | 3/2017 |

OTHER PUBLICATIONS

"Stress-Free Parking," BMW ConnectedDrive: Intelligent Parking; www.bmw.com/com/en/insights/technology/connecteddrive/2013/driver_assistance/intelligent_parking.html; Dec. 2013; 3 pages.

* cited by examiner

NAVIGATION OF IMPAIRED VEHICLE

BACKGROUND

A vehicle typically relies on information from various systems and components, such as a navigation system, sensors, etc. Information from the various systems and components may be used to navigate the vehicle, such as that used to navigate a semi-autonomous or autonomous vehicle. Faults may arise with the various systems and components of the vehicle that render the vehicle wholly or partially inoperable, possibly leaving the vehicle stranded in an undesirable location, such as blocking a road.

DETAILED DESCRIPTION

Introduction

Figure 1:
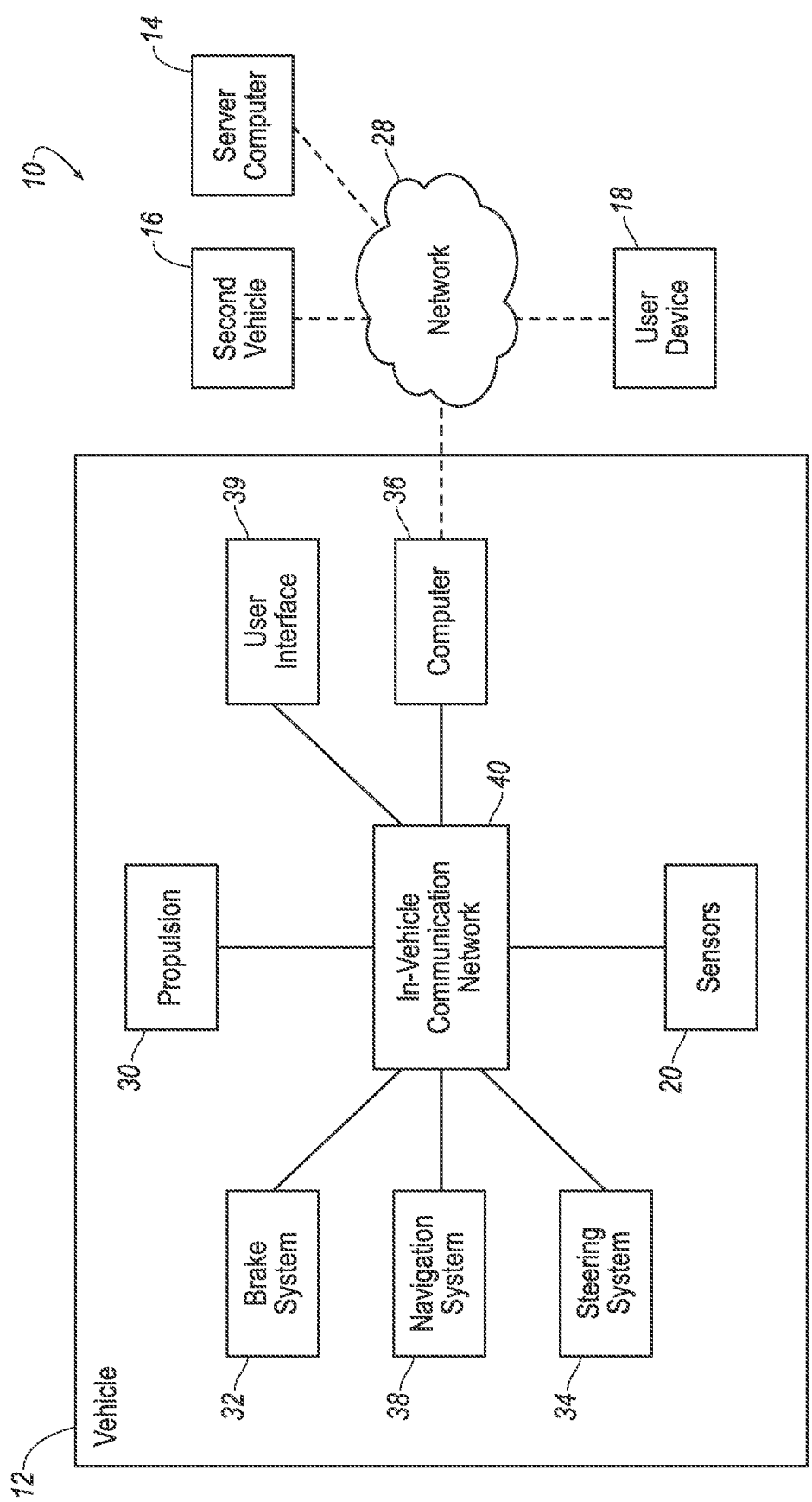
FIG. 1 is a block diagram of an example system for controlling an example vehicle.

Disclosed herein is a method including receiving first data from a first source that is a vehicle. The first data identifies a fault of the vehicle. The method includes receiving second data from a second source outside the vehicle describing an area around the vehicle. The method includes determining, based on the first and second data, a navigational plan. The method includes transmitting an instruction to the vehicle to actuate the vehicle according to the navigational plan.

The second data may include a vehicle location.

The instruction to the vehicle may include an instruction to actuate one or more of a propulsion, a brake system, and a steering system.

The first data may include a location of the vehicle.

The second data may include data describing navigation of at least one other vehicle.

The second data may include a location of an object.

The second data may include a status identifier of an element within the area around the vehicle.

The method may include transmitting the first data in response to a determination that the vehicle cannot operate in a normal mode.

The method may include actuating a brake system of the vehicle to bring the vehicle to a stop upon at least one of a detection of an object in a path of the vehicle and a detection of an impact to the vehicle. The method may include determining that the vehicle cannot operate in the normal mode in response to the stop.

The method may include identifying a location of the vehicle after bringing the vehicle to the stop. The method may include transmitting the first data in response to a determination that the location is not an authorized stop location.

The method may include determining an area traversable by the vehicle. The navigational plan may include a route outside the area traversable by the vehicle.

The method may include transmitting the first data in response to identifying the fault as preventing the vehicle from operating in the normal mode.

Disclosed herein is a computer programmed to perform the method.

Disclosed herein is a computer readable medium storing program instructions executable by a computer processor to perform the method.

Disclosed herein is a system including a server computer and a vehicle computer. The computers are programmed to jointly perform the method.

Disclosed herein is a system including a computer programmed to receive first data from a first source that is a vehicle. The first data identifies a fault of the vehicle. The computer is programmed to receive second data from a second source outside the vehicle describing an area around the vehicle. The computer is programmed to determine, based on the first and second data, a navigational plan. The computer is programmed to transmit an instruction to the vehicle to actuate the vehicle according to the navigational plan.

The second data may include a vehicle location.

The instruction to the vehicle may include an instruction to actuate one or more of a propulsion, a brake system, and a steering system.

The first data may include a location of the vehicle.

The second data may include data describing navigation of at least one other vehicle.

The system may include a second computer that is in the vehicle. The second computer may be programmed to transmit the first data in response to a determination that the vehicle cannot operate in a normal mode.

The second computer may be programmed to actuate a brake system of the vehicle to bring the vehicle to a stop upon at least one of a detection of an object in a path of the vehicle and a detection of an impact to the vehicle. The second computer may be programmed to determine that the vehicle cannot operate in the normal mode in response to the stop.

The second computer may be programmed to identify a location of the vehicle after bringing the vehicle to the stop. The second computer may be programmed to transmit the first data in response to a determination that the location is not an authorized stop location.

The second computer may be programmed to determine an area traversable by the vehicle. The navigational plan may include a route outside the area traversable by the vehicle.

The second computer may be programmed to transmit the first data in response to identifying the fault as preventing the vehicle from operating in the normal mode.

Figure 2:
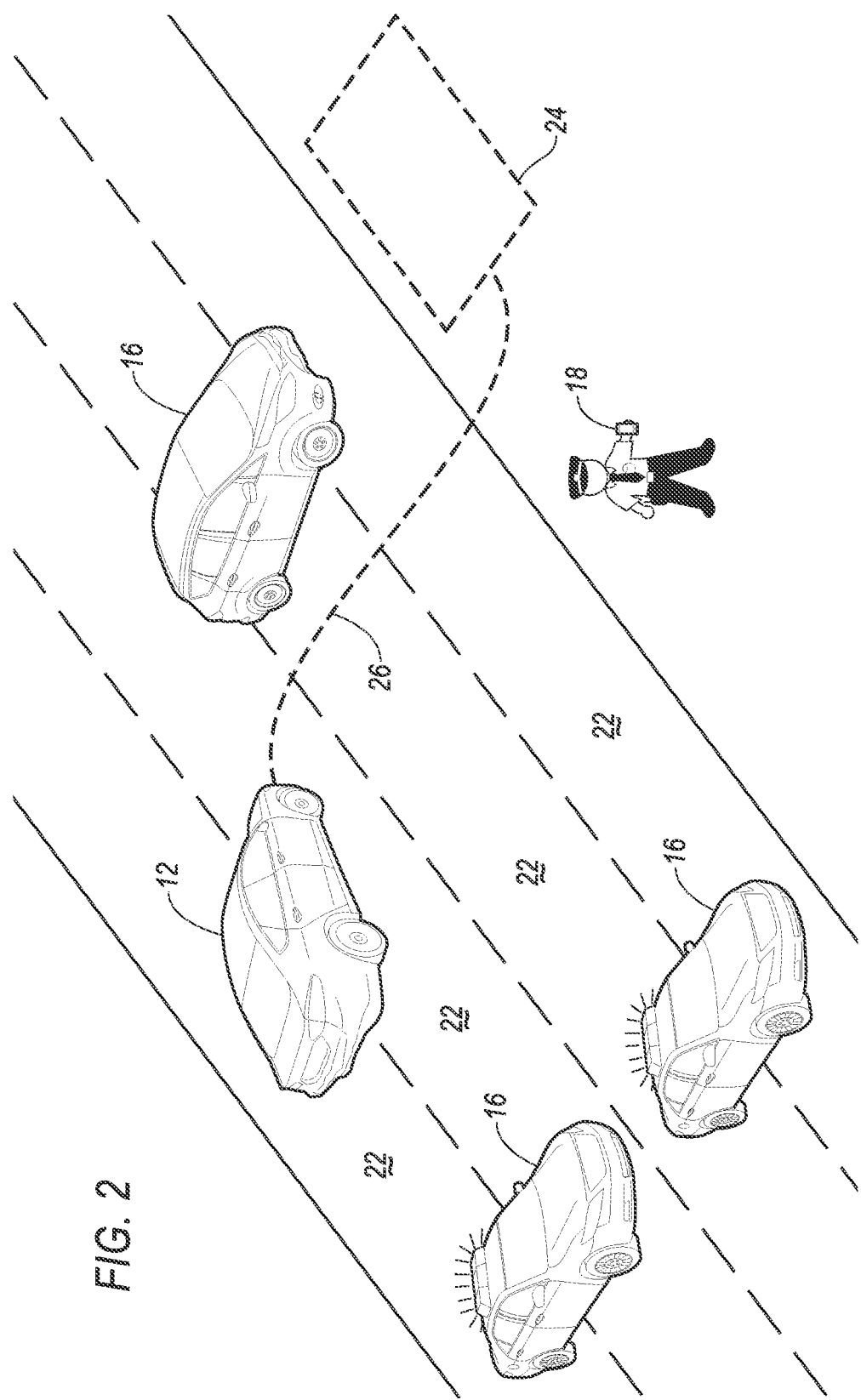
FIG. 2 is a perceptive view of the example vehicle for use with the example system for controlling the example vehicle.

With reference to FIGS. 1 and 2, a system 10 for controlling a vehicle 12 addresses the problem of the vehicle 12 being adversely effected due to a fault with one or more vehicle 12 components or systems. A computer, e.g., a server computer 14, can be programmed to provide instructions to the vehicle 12. The server computer 14 receives information from the vehicle 12 and from at least one other source. Accordingly, the server computer 14 is programmed to receive first data from a first source that is the vehicle 12. The first data describes a fault of the vehicle 12. The server computer 14 is programmed to receive second data from a second source outside the vehicle 12. Example sources outside the vehicle 12 include one or more other vehicles 16, one or more other server computers 14, a user device 18, etc. The second data describes an area around the vehicle 12. The server computer 14 is programmed to determine, based on the first and second data, a navigational plan. The server computer 14 is programmed to transmit an instruction to the vehicle 12 to actuate the vehicle 12 according to the navigational plan.

As used herein, "fault" is a state in which one or more components of the vehicle 12 are not operating properly, i.e., one or more components of the vehicle 12 are malfunctioning or inoperable. Each fault may be associated with a specific vehicle 12 component, e.g., a specific vehicle 12 system, subsystem, device, sensor 20, etc. A fault may be determined based on a message from a vehicle 12 component explicitly indicating the fault. A fault may be determined based on information from one or more vehicle 12 components, and/or sensors 20, that may be used to infer one or more fault with one or more vehicle 12 components.

As used herein, "area around the vehicle" 12 is an area within a threshold distance, e.g., 50 meters, of a location of the vehicle 12. When this disclosure refers to a "location," it is to be understood that the location could be determined in a known manner, e.g., according to geo-coordinates such as are known. For example, global positioning system (GPS) devices can determine latitude and longitude, and could be used to determine locations discussed herein.

The data describing the area around the vehicle 12 may include characteristics of terrain and objects within the area. For example, the data may describe a surface type of various portions of the area, e.g. paved, gravel, lawn, water, etc. The data may describe a surface profile of various portions of the area, e.g., a slope, including an angle and direction of such slope, a tier, including an elevation change such as a drop off such of tier, etc. The data may provide a location of one or more objects within the area, e.g., the location of another vehicle 16, the location of an infrastructure element such as a road barrier or overpass support column, etc. The data describing the area around the vehicle 12 may include a status identifier of elements within the area, e.g., that a lane 22 within the area is closed to traffic, e.g., the lane 22 is blocked upstream of the area around the vehicle 12. The data describing the area around the vehicle 12 may include a vehicle location 24. As used herein "vehicle location" 24 is a location for the vehicle 12, e.g., after navigating the vehicle 12 according to the navigational plan. The data describing the area around the vehicle 12 may describe navigation of at least one other vehicle, e.g., the second vehicle 16, in the area around the vehicle 12. The data describing the area around the vehicle 12 may include image data, e.g., obtained by one or more other vehicles 16 located in the area around the vehicle 12.

As used herein, "navigational plan" is a set of one or more instructions to actuate the vehicle 12 components to bring the vehicle 12 to an identified location. The navigational plan thus includes a route 26 along with the instructions specifying actuation of one or more vehicle 12 components along the route 26.

As used herein, "route" 26 is a series of one or more locations and/or vectors to be used for navigating the vehicle 12, e.g., to actuate the vehicle 12 according to the navigational plan. The vector may include a direction, e.g., a compass heading direction, and a distance, e.g., 10 meters.

The Wide Area Network

A network 28 (sometimes referred to as a wide area network because it can include communications between devices that are geographically remote from one another, i.e., not in a same building, vehicle 12, etc.) represents one or more mechanisms by which remote devices, e.g., the vehicle 12, the second vehicle 16, the server computer 14, the user device 18, etc., may communicate with each other. Accordingly, the network 28 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The Vehicle

The vehicle 12 may include any passenger or commercial automobile such as a car, a truck, a sport utility vehicle, a crossover vehicle, a van, a minivan, a taxi, a bus, etc. The vehicle 12 may operate in an autonomous (e.g., driverless) mode, a semi-autonomous mode, and/or a non-autonomous mode. For purposes of this disclosure, an autonomous mode is defined as one in which each of a propulsion 30, a brake system 32, and a steering system 34 of the vehicle 12 are controlled by one or more vehicle 12 computers 36; in the semi-autonomous mode one or two of the vehicle 12 propulsion 30, brake system 32, and steering system 34 are controlled by one or more vehicle 12 computers 36; each of these are controlled by a human operator in the non-autonomous mode. The vehicle 12 may additionally include sensors 20, a navigation system 38, a user interface 39, and an in-vehicle communication network 40 for providing communication between the vehicle 12 components.

The propulsion 30 of the vehicle 12 translates stored energy into motion of the vehicle 12. The propulsion 30 may be a conventional vehicle 12 subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion 30. The propulsion 30 is in communication with and receives input from the vehicle 12 computer 36 and from a human driver. The human driver may control the propulsion 30 via an input device, e.g., an accelerator pedal and/or a gear-shift lever. The propulsion 30 may send a message to the vehicle 12 computer 36. The message may indicate a fault with the propulsion 30. The message may indicate a state of the propulsion 30, e.g., that the electric motor is outputting torque, e.g., in response to an instruction received from the vehicle 12 computer 36.

The brake system 32 can be a conventional vehicle 12 subsystem that resists the motion of the vehicle 12 to thereby slow and/or stop the vehicle 12. The brake system 32 may be friction brakes such as disc brakes, drum brakes, band brakes, etc.; regenerative brakes; any other suitable type of brakes; or a combination. The brake system 32 can include an electronic control unit (ECU) or the like that actuates the brake system 32 to resist the motion of the vehicle 12, e.g., in response to a command from the vehicle 12 computer 36 and/or from a human driver. The human driver may control the brake system 32 via an input device, e.g., a brake pedal. The brake system 32 may send a message to the vehicle 12 computer 36. The message may indicate a fault with the brake system 32. The message may indicate a state of the brake system 32, e.g., that the disc brake is engaged, e.g., in response to an instruction received from the vehicle 12 computer 36.

The steering system 34 is typically a conventional vehicle 12 subsystem and controls the turning of the wheels, i.e., changes wheel orientation. The steering system 34 is in communication with and receives input from a steering wheel and/or the vehicle 12 computer 36. The steering system 34 may be a rack-and-pinion system with electric power-assisted steering, a steer-by-wire system, as are both known in the art, or any other suitable system. The steering system 34 may send a message to the vehicle 12 computer 36. The message may indicate a fault with the steering system 34. The message may indicate a state of the steering system 34, e.g., that the steer-by-wire wire system is turning the wheels, e.g., in response to an instruction received from the vehicle 12 computer 36.

The vehicle 12 sensors 20 may detect internal states of the vehicle 12, for example, wheel speed, wheel orientation, tire pressure, suspension travel, brake sensors, traction control sensors, and engine and transmission variables. The vehicle 12 sensors 20 may detect the position or orientation of the vehicle 12, for example, global positioning system (GPS) sensors; accelerometers such as piezo-electric or microelectromechanical systems (MEMS); gyroscopes such as rate, ring laser, or fiber-optic gyroscopes; inertial measurement units (IMU); and magnetometers. The vehicle 12 sensors 20 may detect the external world, for example, light measurement sensors, photometers, wind speed measurement sensors, proximity sensors, radar sensors, scanning laser range finders, light detection and ranging (LIDAR) devices, and image processing sensors such as cameras. The vehicle 12 sensors 20 may provide vehicle 12 data to detect an impact to the vehicle 12, e.g., sensors 20 may include post-contact sensors such as accelerometers, pressure sensors, and contact switches.

The vehicle 12 navigation system 38 determines a location and orientation of the vehicle 12 according to map data, e.g., by geocoordinates and compass heading direction that can be used to determine the vehicle location 24 and orientation on a map. To determine the location and orientation of the vehicle 12, the vehicle 12 navigation system 38 may rely on information from a global navigation satellite system, distance data from vehicle 12 sensors 20 attached to a drivetrain of the vehicle 12, a gyroscope, an accelerometer, a magnetometer, and/or other vehicle 12 sensors 20.

The map data may include roads and related data, such as a number of lanes 22, parking lot locations, etc. The map data may include area traversable by the vehicle 12. The map data may include authorized stop locations. The map data may be stored locally, such as in the vehicle 12 computer 36 memory (discussed below), in the vehicle 12 navigation system 38, etc., and remotely, such as in the server computer 14. Exemplary vehicle 12 navigation systems 38 include known GPS (global positioning system) navigation devices, personal navigation devices, and automotive navigation systems. A location as described herein can be specified in geo-coordinates such as are known, and the map data may specify a location of map features such as roads, landmarks, etc., according to such geo-coordinates.

An "authorized stop location" is a predetermined location where the vehicle 12 may stop, e.g., with little adverse effect such as a potential collision with another vehicle 16, being subject to towing and/or traffic citations, etc. Example authorized stop locations include locations at parking lots, designated street side parallel parking, driveways, etc.

An "area traversable by the vehicle" 12 is a geographic region where the vehicle 12 may operate in a normal mode (defined below) with little adverse effect such as a potential collision with another vehicle 12, a traffic citation, a loss of traction, i.e., getting "stuck," etc. The area traversable by the vehicle 12 may include roads, including a specific lane 22 and a permitted direction of travel therein. The area traversable by the vehicle 12 may include other regions specifically designed for ordinary vehicle 12 transportation duties, e.g., parking lots, etc. The area traversable by the vehicle 12 may exclude regions not specifically designed for ordinary vehicle 12 transportation duties that may nonetheless be navigable by the vehicle 12, e.g., a shoulder of a road, a median of a divided highway, etc., including navigating in a lane 22 or road in a direction other than the permitted direction of travel.

The user interface 39 presents information to and receives information from an occupant of the vehicle 12. The user interface 39 may be located, e.g., on an instrument panel in the passenger cabin of the vehicle 12, or wherever may be readily seen by the occupant. The user interface 39 may include dials, digital readouts, screens such as a touch-sensitive display screen, speakers, and so on for providing information to the occupant, e.g., human-machine interface (HMI) elements. The user interface 39 may include buttons, knobs, keypads, microphone, and so on for receiving information from the occupant.

The in-vehicle communication network 40 includes hardware, such as a communication bus, an antenna, circuits, chips, etc., for facilitating wired or wireless communication among the vehicle 12 components in accordance with a number of communication protocols such as the Dedicated Short Range Communication (DSRC) communication protocol, controller area network (CAN), Ethernet, WiFi, Local Interconnect Network (LIN), and/or other wired or wireless mechanisms.

The vehicle 12 computer 36, implemented via circuits, chips, antenna and/or other electronic components, is included in the vehicle 12 for carrying out various operations and processes, including those described herein. The vehicle 12 computer 36 is a computing device that generally includes a processor and a memory, the memory including one or more forms of computer-readable media, and storing instructions executable by the processor for performing various operations and processes, including those described herein. The memory of the vehicle 12 computer 36 further generally stores remote data received via various communications mechanisms; e.g., the vehicle 12 computer 36 is generally configured for communications with vehicle 12 components on a controller area network (CAN) bus, e.g., the in-vehicle communication network 40, and for using other wired or wireless protocols to communicate with devices outside the vehicle 12, e.g., Bluetooth®, IEEE 802.11 (colloquially referred to as WiFi), satellite telecommunication protocols, and cellular protocols such as 3G, LTE, etc. Via the in-vehicle communication network 40 the vehicle 12 computer 36 may transmit messages to various devices in the vehicle 12 and/or receive messages from the various devices, e.g., systems, actuators, sensors 20, etc., e.g., as discussed herein. Although one vehicle 12 computer 36 is shown in FIG. 1 for ease of illustration, it is to be understood that the vehicle 12 computer 36 could include, and various operations described herein could be carried out by, one or more computing devices.

The vehicle 12 computer 36 is programmed to receive vehicle 12 data, i.e., data provided via a vehicle 12 network such as a CAN bus or the like. Vehicle 12 data may include messages from the vehicle 12 components. Vehicle 12 data may include data from the sensors 20. Vehicle 12 data may be received via the in-vehicle communication network 40.

The vehicle 12 computer 36 may be programmed to determine whether an impact to the vehicle 12 has been detected, e.g., using known techniques based on information from the sensors 20, e.g., accelerometers, pressure sensors, and contact switches.

The vehicle 12 computer 36 may be programmed to determine whether an object in a path of the vehicle 12 has been detected. As used herein, a "path of the vehicle" 12 is an area within a threshold distance of a location of vehicle 12, e.g., 50 meters, and in a direction of vehicle 12 travel, e.g., in front of a forward traveling vehicle 12. An object in the path of the vehicle 12 presents a collision risk with the vehicle 12 if the vehicle 12 is not stopped or if the vehicle 12 does not change direction. The vehicle 12 computer 36 may determine whether there is an object in the path of the vehicle 12 based on information from the vehicle 12 sensors 20, e.g., sensors configured to detect wheel orientation, proximity sensors, radar sensors, scanning laser range finders, light detection and ranging (LIDAR) devices, and image processing sensors such as cameras.

The vehicle 12 computer 36 may be programmed to actuate the brake system 32 of the vehicle 12 to bring the vehicle 12 to a stop. As used herein, "stop" is a state of the vehicle 12 where a speed of the vehicle 12 is substantially zero, i.e., the vehicle 12 is not moving. The vehicle 12 computer 36 may actuate the brake system 32 to bring the vehicle 12 to the stop by sending an instruction to the brake system 32. The vehicle 12 computer 36 may actuate the brake system 32 to bring the vehicle 12 to the stop upon the detection of the object in the path of the vehicle 12. The vehicle 12 computer 36 may actuate the brake system 32 to bring the vehicle 12 to the stop upon the detection of the impact to the vehicle 12. The vehicle 12 computer 36 may actuate the brake system 32 to bring the vehicle 12 to the stop based on the vehicle 12 data, e.g., indicating a fault. The vehicle 12 computer 36 may actuate the brake system 32 to bring the vehicle 12 to the stop upon receiving a user input via the user interface 39.

The vehicle 12 computer 36 may be programmed to identify a location of the vehicle 12. For example, the vehicle 12 computer 36 may determine the location of the vehicle 12 based on information received from the navigation system 38 via the in-vehicle communication network 40. The vehicle 12 computer 36 may identify the location of the vehicle 12 in response to actuating the brake system 32 to bring the vehicle 12 to the stop.

The vehicle 12 computer 36 may be programmed to identify one or more faults of the vehicle 12. The vehicle 12 computer 36 may identify fault(s) based on messages and/or data received from the vehicle 12 components and/or sensors 20, and/or a lack thereof.

The vehicle 12 computer 36 may identify the fault based on a message received from a vehicle 12 component indicating the fault, e.g., Controller Area Network 28 (CAN) messages can indicate vehicle 12 component malfunctions. For example, the vehicle 12 computer 36 may receive a fault message from the brake system 32 indicating a malfunction of the brake system 32.

The vehicle 12 computer 36 may identify the fault based on other messages received from the one or more components of the vehicle 12. For example, the vehicle 12 computer 36 may identify the fault indicating the malfunctioning of the brake system 32 based on a message from the brake system 32 indicating actuation of the brake system 32 other than instructed by the vehicle 12 computer 36.

The vehicle 12 computer 36 may identify the fault based on a lack of a message from the one or more components of the vehicle 12. For example, the vehicle 12 computer 36 may identify the fault indicating the malfunctioning of the brake system 32 based on a lack of response within a predetermined amount of time, e.g., 100 milliseconds, from the brake system 32 to an instruction provided to the brake system 32.

The vehicle 12 computer 36 may identify the fault based on data received from the vehicle 12 sensors 20. For example, sensor 20 data may indicate the vehicle 12 is not responding in an expected manner after an instruction has been sent to actuate a vehicle 12 component, e.g., the vehicle 12 is not decelerating at an expected rate after the instruction to the brake system 32.

The vehicle 12 computer 36 may identify the fault based on a lack of data from the sensors 20. For example, the vehicle 12 computer 36 may identify a fault indicating a malfunction of the LIDAR sensor when no data is received from the LIDAR sensor for a predetermined amount of time, e.g. 500 milliseconds.

Messages and/or data from multiple vehicle 12 components and/or sensors 20 may be combined to identify one or more faults with one or more vehicle 12 components and/or sensors 20. Additional fault identification techniques and methods may be used.

The vehicle 12 computer 36 may be programmed to determine whether the vehicle 12 cannot operate in the normal mode. As used herein, the "normal mode" is a state of the vehicle 12 in which a predetermined set of vehicle 12 components are operating without a fault.

The predetermined set of vehicle 12 components is typically defined to include components needed for operation of the vehicle 12 to safely travel on a public roadway, e.g., to navigate to a location, to detect an object that may pose a collision risk, to stop the vehicle 12 at a threshold deceleration rate, e.g., 20 miles per hour per second, to propel the vehicle 12 at a threshold speed, e.g. 55 miles per hour, etc., without necessarily relying on information from the source outside the vehicle 12. Example components that may be included in the predetermined set of components include the brake system 32, the steering system 34, the propulsion 30, the sensors 20, e.g., sensors used to navigate the vehicle 12, the navigation system 38, etc. The predetermined set of vehicle 12 components may be stored in a lookup table or the like, e.g., in the memory of the vehicle 12 computer 36.

The vehicle 12 computer 36 may be programmed to determine whether the vehicle 12 cannot operate in the normal mode by comparing the predetermined set of vehicle 12 components with the one or more faults identified by the vehicle 12 computer 36. The vehicle 12 computer 36 may determine the vehicle 12 cannot operate in the normal mode when the fault(s) indicate that one or more of the vehicle 12 components of the predetermined set of vehicle 12 components is malfunctioning. Other methods may be used to determine whether the vehicle 12 cannot operate in the normal mode.

The vehicle 12 computer 36 may determine whether the vehicle 12 cannot operate in the normal mode in response actuating the brake system 32 of the vehicle 12 to bring the vehicle 12 to the stop.

The vehicle 12 computer 36 may be programmed to determine whether the vehicle 12 is at an authorized stop location. Additionally or alternatively to being included in the map data, authorized stop locations may be stored in a look-up table or the like, e.g., in the memory of the vehicle 12 computer 36, in the server computer 14, etc., including such locations, e.g., as GPS coordinates. The vehicle 12 computer 36 may determine whether the vehicle 12 is at an authorized stop location by comparing the identified location of the vehicle 12 with the predetermined locations where the vehicle 12 may stop.

The vehicle 12 computer 36 is programmed to transmit data, e.g., the location of the vehicle 12, the identified fault(s), vehicle 12 data, etc. The vehicle 12 computer 36 may transmit the data to the server computer 14. For example, the transmitted data may include identification information, e.g., a unique name or other identifier, Internet protocol (IP) address, etc., for the server computer 14. The data may be transmitted in response to the determination that the vehicle 12 cannot operate in the normal mode. For example, the data may be transmitted in response to identifying the fault as preventing the vehicle 12 from operating in the normal mode, e.g., in response to identifying a fault included in the predetermined set of vehicle 12 components needed for operation of the vehicle 12 to safely travel on a public roadway. The data may be transmitted in response to determining that the location of the vehicle 12 is not at an authorized stop location.

The vehicle 12 computer 36 may be programmed to receive an instruction to actuate one or more of the vehicle 12 components. For example, the vehicle 12 computer 36 may be programmed to receive such instruction from the server computer 14 via the network 28.

The vehicle 12 computer 36 may be programmed to actuate vehicle 12 components. For example, the vehicle 12 computer 36 may transmit instructions to the brake system 32, the propulsion 30, the steering system 34, etc., via the in-vehicle communication network 40.

The Second Vehicle

The second vehicle 16 may be implemented as described above for the vehicle 12.

The second vehicle 16 may be programmed to transmit a location of the second vehicle 16, the location of one or more objects, e.g., relative to the location of the second vehicle 16, a status of a lane 22 and/or road blocked the second vehicle 16, data describing navigation of the second vehicle 16, vehicle 16 data, e.g., image data from sensors of the second vehicle 16, etc. The second vehicle 16 may determine such information based on information, e.g., image data, from sensors, a navigation system, etc., of the second vehicle 16. The second vehicle 16 may transmit such information in response to a request, e.g., from the server computer 14. The second vehicle 16 may transmit such information to the server computer 14, e.g. via the network 28.

The User Device

The user device 18 may be any one of a variety of computing devices implemented via circuits, chips, antenna, or other electronic components, and is typically a portable device, e.g., a smartphone, a tablet, a personal digital assistant, etc. The user device 18 may include a computer having a processor and a memory. The memory my store instructions for executing the programming and processes described herein. The user device 18 may include a user interface that presents information to and receives information from a user of the user device 18. The user interface may include a touch-sensitive display screen, speaker, microphone, etc. The user device 18 may communicate with other vehicles and computing devices, as described herein.

The user device 18 may be programmed to transmit characteristics of terrain and objects including a location of such terrain and objects, a status identifier of a lane 22, e.g., the lane 22 is closed to traffic in the area around the vehicle 12, a vehicle location 24, etc. The user device 18 may identify such information based on a user input to the user interface. The user device 18 may transmit such information to the server computer 14. The user device 18 may transmit such information in response to a user input to the user interface.

The Server Computer

The server computer 14 is a computing device that includes hardware, e.g. circuits, chips, antenna, etc., programmed to transmit, receive, and process information, to and from other computing devices such as those in the vehicle 12, the second vehicle 16, the user device 18, etc., e.g., via the network 28. The server computer 14 may be one or more computers, each generally including at least one processor and at least one memory, implemented as described herein, the memory storing instructions executable by the processor, including instructions for carrying out various processes described herein.

The server computer 14 is programmed to receive data, e.g., the data identifying the fault of the vehicle 12, the data describing the area around the vehicle 12, vehicle 12 16 data, e.g. image data, etc. The data may be received from the vehicle 12, the second vehicle 16, the user device 18, another server computer, etc. The data may be received via the network 28.

The server computer 14 is programmed to identify objects in the area around the vehicle 12, e.g., based on the location of the vehicle 12 and/or the second vehicle 16, and on the vehicle 12 16 data, e.g., image data, e.g., using image recognition processes and techniques, such as are known.

The server computer 14 is programmed to determine the navigational plan. The navigational plan is based on data identifying the fault of the vehicle 12 and on the data describing an area around the vehicle 12.

To determine the navigational plan the server computer 14 may supplement the map data stored on the server computer 14 with objects included in the data describing the area around the vehicle 12, identified by the server computer 14, etc. For example, the map data may be supplemented to include the location of the second vehicle 16, the location of infrastructure elements, etc. The navigational plan may be determined to avoid collision between the vehicle 12 and such objects.

To determine the navigational plan the server computer 14 may identify areas not specifically designed for ordinary vehicle 12 transportation duties that may be preferable to current location. For example, the server computer 14 may store a lookup table or the like with preferred areas, e.g., a right shoulder is preferred over a left shoulder, a center lane left hand turn lane is preferred over lanes for normal travel, an outside lane is preferred over an inner lane, a gravel area preferred over a lawn area, etc. The lookup table may be populated based on the data describing the area around the vehicle 12, e.g., received from another server computer, the user device 18, etc.

To determine the navigational plan the server computer 14 may identify areas that have nullified collision risk, e.g., a blocked lane 22 and/or road that would normally have traffic. The server computer 14 may identify such area based on the data describing the area around the vehicle 12. For example, based on the data describing the area around the vehicle 12 that identifies the second vehicle 16 is stopped in a lane 22 or road thereby blocking traffic therein. The navigational plan may include navigation of the blocked lane 22 and/or road without necessary relying on vehicle 12 sensor 20 data that may be normally used to navigate such area, e.g., to avoid collision with other vehicles than may typically navigate the lane 22 and/or road.

To determine the navigational plan the server computer 14 may identify what vehicle 12 components are functioning, e.g., based on the data indicating vehicle 12 faults. Based on such identification, the navigational plan may use alternate actuation strategies, e.g., only drive in reverse, only make left hand turns, etc. The server computer 14 may limit locations for use with the navigational plan to those the vehicle 12 is capable of navigating to with fault. The server computer 14 may identify other limits of vehicle 12 components, e.g., a limited range of travel. Based on such identified limits, the navigational plan may navigate the vehicle 12 only to a location within range of the location of the vehicle 12.

To determine the navigational plan the server computer 14 may identify areas other vehicles 16 have navigated. For example, the data describing the area around the vehicle 12 may indicate that the second vehicle 16 has navigated outside of the area traversable by the vehicle 12. The navigational plan may include navigation of the vehicle 12 along a route 26 through such areas.

To determine the navigational plan the server computer 14 may rely on the vehicle location 24 included in the data describing the area around the vehicle 12, e.g., from the user device 18. The navigational plan may navigate the vehicle 12 to the vehicle location 24.

The server computer 14 may be programmed to transmit an instruction to the vehicle 12, e.g., via the network 28, to actuate the vehicle 12 according to the navigational plan. The instruction to the vehicle 12 may include an instruction to actuate one or more of the propulsion 30, the brake system 32, and the steering system 34. For example, the server computer 14 may determine which vehicle 12 components, individually and in combination, and in what order, to actuate to navigate the vehicle 12 along the route 26 according to the navigational plan, and transmit such instructions to the vehicle 12.

The server computer 14 may be programmed to determine whether the navigational plan is complete. For example, the server computer 14 may compare the location of the vehicle 12 with the location of the navigational plan, e.g., the vehicle location 24. The server computer 14 may determine the navigational plan is complete when the location of the vehicle 12 matches the location of the navigational plan.

Process

Figure 3:
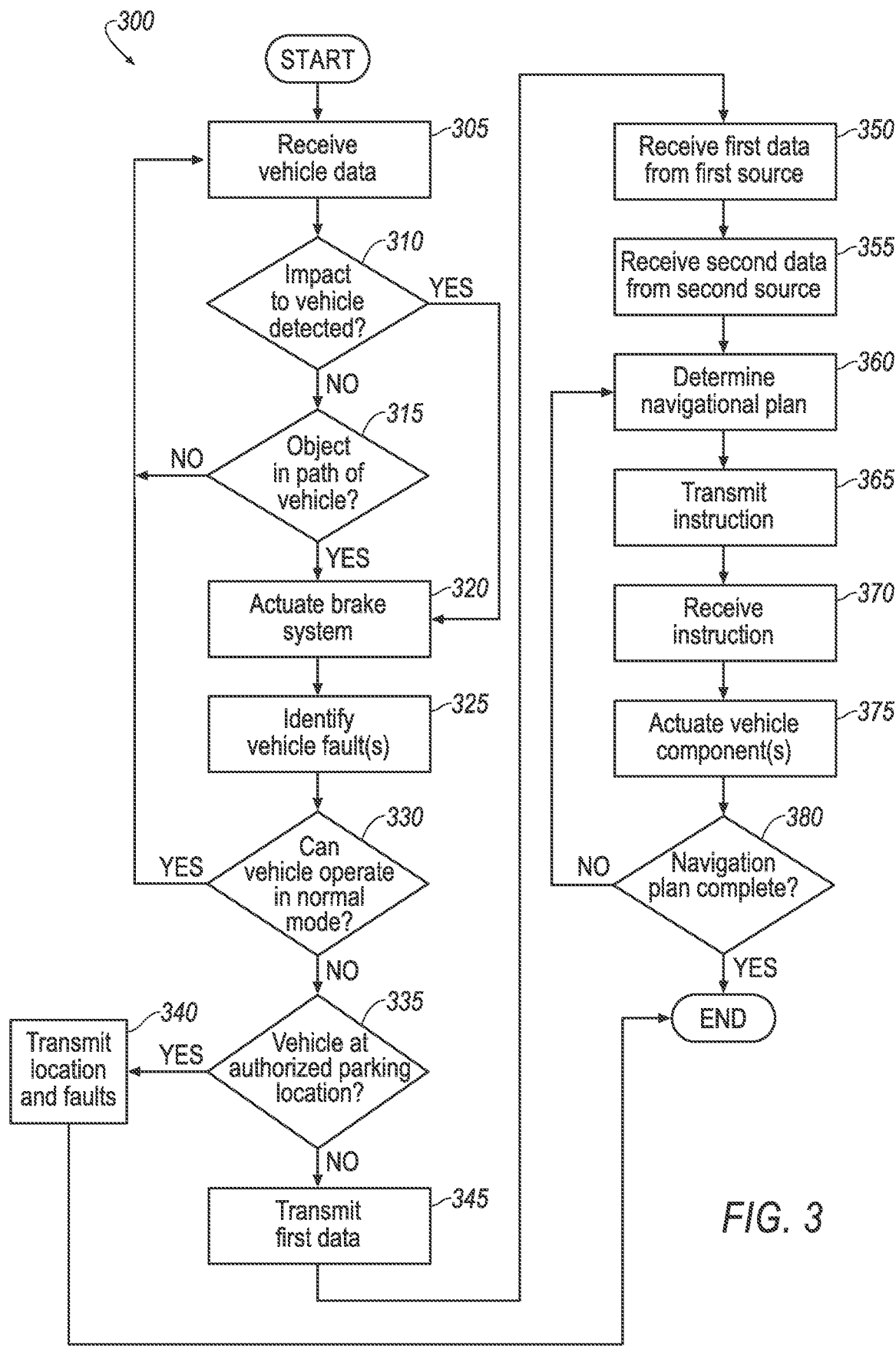
FIG. 3 is an example process of operating the example system for controlling the example vehicle.

FIG. 3 is a process flow diagram illustrating an exemplary process 300 for controlling the vehicle 12. The process 300 may be performed by executing program instructions in the server computer 14 and the vehicle 12 computer 36.

The process 300 begins in a block 305 in which the computer 36 receives vehicle 12 data. Further, the data may be received throughout the process 300. Throughout the process 300, means at time intervals, e.g., every 500 milliseconds, substantially continuously, etc.

Next at a block 310 the computer 36 determines whether an impact to the vehicle 12 has been detected. Upon a determination that no impact has been detected the process 300 moves to a block 315. Upon a determination that an impact has been detected the process 300 moves to a block 320.

At the block 315 the computer 36 determines whether an object in a path of the vehicle 12 has been detected. Upon a determination that an object in a path of the vehicle 12 has been detected the process 300 moves to the block 320. Upon a determination that an object in a path of the vehicle 12 has not been detected the process 300 returns to the block 305.

At the block 320 the computer 36 provides an instruction to actuate the brake system 32 of the vehicle 12 to bring the vehicle 12 to a stop. The computer 36 may actuate the brake system 32 upon determining the impact to the vehicle 12 has been detected, upon determining that the object in a path of the vehicle 12 has been detected, based on the vehicle 12 data, e.g. indicating a fault, upon receiving a user input via the user interface 39, etc. In addition to bringing the vehicle 12 to the stop, the computer 36 may identify the location of the vehicle 12, e.g., upon completion of the stop.

Next at a block 325 the computer 36 may identify one or more faults of the vehicle 12, e.g., based on the received vehicle 12 data.

Next at a block 330 the computer 36 determines whether the vehicle 12 cannot operate in the normal mode, e.g., based on the one or more identified faults. Upon a determination that the vehicle 12 cannot operate in the normal mode the process 300 moves to a block 335. Upon a determination that the vehicle 12 can operate in the normal mode the process 300 returns to the block 305.

At the block 335 the computer 36 determines whether the vehicle 12 is at an authorized stop location. Upon a determination that the vehicle 12 is at an authorized stop location the process 300 moves to a block 340. Upon a determination that the vehicle 12 is not at an authorized stop location the process 300 moves to a block 345.

At the block 340 the computer 36 transmits identified faults and location of the vehicle 12 via the network 28 for receipt by the server computer 14. After the block 340 the process 300 may end.

At the block 345, which may follow the block 335, the computer 36 transmits the vehicle 12 data, identified faults, and the location of the vehicle 12 via the network 28 for receipt by the server computer 14. The vehicle 12 data, identified faults, and the location of the vehicle 12 may be transmitted throughout the process 300.

Next, at the block 350 the server computer 14 receives the vehicle 12 data, the identified faults, and the location of the vehicle 12. The vehicle 12 data, identified faults, and the location of the vehicle 12 may be received in the server computer 14 throughout the process 300.

Next, at the block 355 the computer 14 receives data describing the area around the vehicle 12. For example, the server computer 14 may receive such information from one or more second vehicles 16, from another server computer 14, from one or more user devices 18, etc. The data describing the area around the vehicle 12 may be received throughout the process 300.

Next, at a block 360 the server computer 14 determines a navigational plan, e.g., based on the vehicle 12 data, the identified faults, the location of the vehicle 12, and the data describing the area around the vehicle 12.

Next, at a block 365 the computer 14 transmits an instruction to the vehicle 12 computer 36, e.g., via the network 28, to actuate the vehicle 12, e.g. vehicle 12 components, according to the navigational plan.

Next, at a block 370 the computer 36 receives the instruction to actuate the vehicle 12 according to the navigational plan.

Next, at a block 375 the computer 36 provides one or more instructions to actuate one or more vehicle 12 components, e.g., the propulsion 30, the brake system 32, and/or the steering system 34 may be actuated based on the instruction to actuate the vehicle 12 according to the navigational plan.

Next, at a block 380 the computer 14 determines whether the navigational plan is complete. Upon a determination that the navigational plan is not complete, the process 300 returns to the block 360. Upon a determination that the navigational plan is complete, the process 300 ends.

CONCLUSION

As used herein a computer is a computing device that includes a processor and a memory. The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor can receive the data and execute the processes described herein.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors. The memory may store program instruction executable by the processor to perform the processes described herein.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The adjectives "first" and "second" are used throughout this document as identifiers and are not intended to signify importance or order.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The article "a" modifying a noun should be understood as meaning one or more unless stated otherwise, or context requires otherwise. The phrase "based on" encompasses being partly or entirely based on.

What is claimed is:

1. A system, comprising:
   a computer in a vehicle, the computer programmed to transmit first data identifying a fault of the vehicle in response to a determination that the vehicle cannot operate in a normal mode; and
   a server computer remote from any vehicle and programmed to:
   receive the first data from the computer in the vehicle;
   receive second data from a source outside the vehicle describing an area around the vehicle;
   determine an area traversable by the vehicle in the normal mode, the area traversable by the vehicle in the normal mode including a lane and a permitted direction of travel of the lane;
   determine, based on the first data and the second data, a navigational plan including a route outside the area traversable by the vehicle in the normal mode, the route including traveling in the lane other than in the permitted direction of travel; and
   transmit an instruction to the vehicle to actuate the vehicle according to the navigational plan.

2. The system of claim 1, wherein the second data includes a vehicle location.

3. The system of claim 1, wherein the instruction to the vehicle includes an instruction to actuate one or more of a propulsion system, a brake system, and a steering system.

4. The system of claim 1, wherein the first data includes a location of the vehicle.

5. The system of claim 1, wherein the second data includes data describing navigation of at least one other vehicle.

6. The system of claim 1, the computer in the vehicle further programmed to actuate a brake system of the vehicle to bring the vehicle to a stop upon at least one of a detection of an object in a path of the vehicle and a detection of an impact to the vehicle, and to determine that the vehicle cannot operate in the normal mode in response to the stop.

7. The system of claim 6, the computer in the vehicle further programmed to identify a location of the vehicle after bringing the vehicle to the stop, and to transmit the first data in response to a determination that the location is not an authorized stop location.

8. The system of claim 1, the computer in the vehicle programmed to transmit the first data in response to identifying the fault as preventing the vehicle from operating in the normal mode.

9. A system, comprising:
- a computer in a vehicle, the computer programmed to transmit first data identifying a fault of the vehicle in response to a determination that the vehicle cannot operate in a normal mode; and
- a server computer remote from any vehicle and programmed to:
- receive the first data from the vehicle;
- receive second data from a user device that is one of a smartphone or a tablet computer outside the vehicle, the second data describing an area around the vehicle;
- determine, based on the first data and the second data, a navigational plan; and
- transmit an instruction to the vehicle to actuate the vehicle according to the navigational plan.

10. The system of claim 1, wherein the server computer is programmed to determine the navigational plan by identifying an area that has a nullified collision risk.

\* \* \* \* \*